US012190838B2

(12) United States Patent
Um et al.

(10) Patent No.: US 12,190,838 B2
(45) Date of Patent: Jan. 7, 2025

(54) CONTROL METHOD FOR DISPLAY PANEL AND DISPLAY PANEL

(71) Applicant: Shenzhen China Star Optoelectronics Semiconductor Display Technology Co., Ltd., Guangdong (CN)

(72) Inventors: Yoonsung Um, Guangdong (CN); Zhigang Peng, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/789,230

(22) PCT Filed: May 13, 2022

(86) PCT No.: PCT/CN2022/092767
§ 371 (c)(1),
(2) Date: Jun. 27, 2022

(87) PCT Pub. No.: WO2023/216245
PCT Pub. Date: Nov. 16, 2023

(65) Prior Publication Data

US 2024/0185812 A1 Jun. 6, 2024

(30) Foreign Application Priority Data

May 7, 2022 (CN) ......................... 202210492148.6

(51) Int. Cl.
*G09G 3/36* (2006.01)

(52) U.S. Cl.
CPC ......... *G09G 3/3607* (2013.01); *G09G 3/3696* (2013.01); *G09G 2320/0666* (2013.01)

(58) Field of Classification Search
CPC ............... G09G 3/3607; G09G 3/3696; G09G 2320/0666
See application file for complete search history.

(56) References Cited

U.S. PATENT DOCUMENTS

2008/0198285 A1 8/2008 Hsieh et al.
2008/0284931 A1* 11/2008 Kimura .............. G02F 1/13624 349/39

(Continued)

FOREIGN PATENT DOCUMENTS

CN 102621755 8/2012
CN 104698643 6/2015

(Continued)

OTHER PUBLICATIONS

Notification of Office Action and Search Report Dated Apr. 24, 2023 From the State Intellectual Property Office of the People's Republic of China Re. Application No. 202210492148.6 and Its Translation Into English. (20 Pages).

(Continued)

*Primary Examiner* — Dmitriy Bolotin

(57) ABSTRACT

The present application discloses a control method for a display panel and a display panel, which adjust a shared voltage signal transmitted by the one of the sharing lines electrically connected to the auxiliary pixel electrodes of the sub-pixels corresponding to a color of color shift according to the color of color shift displayed by the display panel, so that the shared voltage signal after the adjusting is different from the shared voltage signal transmitted by the sharing lines electrically connected to the auxiliary pixel electrodes of the sub-pixels with different emission colors, so as to alleviate the problem of color shift of the display panel.

19 Claims, 8 Drawing Sheets

(56) References Cited

U.S. PATENT DOCUMENTS

| | | | | |
|---|---|---|---|---|
| 2009/0231505 | A1 | 9/2009 | Wang et al. | |
| 2016/0202522 | A1* | 7/2016 | Lee | G02F 1/133514 349/106 |
| 2017/0103726 | A1* | 4/2017 | Shin | G09G 3/3696 |
| 2017/0287432 | A1* | 10/2017 | Yoon | G09G 3/3677 |
| 2018/0350317 | A1* | 12/2018 | Shin | G09G 3/3648 |
| 2022/0308407 | A1* | 9/2022 | Um | G02F 1/136286 |
| 2022/0319459 | A1* | 10/2022 | Zhang | G02F 1/13624 |
| 2024/0046896 | A1* | 2/2024 | Wang | G09G 3/3607 |

FOREIGN PATENT DOCUMENTS

| | | |
|---|---|---|
| CN | 106249498 | 12/2016 |
| CN | 106842750 | 6/2017 |
| CN | 106855668 | 6/2017 |
| CN | 107643634 | 1/2018 |
| CN | 107678221 | 2/2018 |
| CN | 110109296 | 8/2019 |
| CN | 110794626 | 2/2020 |
| CN | 112799255 | 5/2021 |

OTHER PUBLICATIONS

International Search Report and the Written Opinion Dated Dec. 28, 2022 From the International Searching Authority Re. Application No. PCT/CN2022/092767 and Its Translation Into English. (19 Pages).

* cited by examiner

CONTROL METHOD FOR DISPLAY PANEL AND DISPLAY PANEL

RELATED APPLICATIONS

This application is a National Phase of PCT Patent Application No. PCT/CN2022/092767 having International filing date of May 13, 2022, which claims the benefit of priority of Chinese Patent Application No. 202210492148.6 filed on May 7, 2022. The contents of the above applications are all incorporated by reference as if fully set forth herein in their entirety.

FIELD AND BACKGROUND OF THE INVENTION

The present application relates to the field of display technology, and in particular, to a control method for a display panel, a display panel and a display device.

Description of Prior Art

In a vertical alignment mode liquid crystal display panel, an 8-domain pixel structure (i.e., a pixel is divided into two parts, a sub-area and a main area) is often used to alleviate the problem of color shift. However, due to factors such as materials and process technology, the display panel will inevitably have a certain sub-pixel with a large color coordinate, resulting in the problem of color shift in the picture.

Embodiments of the present application provide a control method for a display panel, a display panel and a display device, so as to alleviate the problem that the display panel still has color shift due to limitations of factors such as materials and manufacturing processes.

SUMMARY OF THE INVENTION

An embodiment of the present application provides a control method for a display panel, where the display panel includes a plurality of sub-pixels, a plurality of pixel driving circuits, a plurality of data lines, and a plurality of sharing lines; each of the sub-pixels includes a main pixel electrode and an auxiliary pixel electrode, each of the pixel driving circuits is electrically connected to a corresponding one of the sub-pixels, and each of the pixel driving circuits includes a first transistor, a second transistor, and a third transistor; each of the data lines is connected to a corresponding one of main pixel electrodes through the first transistor, each of the data lines is further electrically connected to a corresponding one of auxiliary pixel electrodes through the second transistor, and each of the sharing lines is electrically connected to the corresponding one of the auxiliary pixel electrodes through the third transistor; and the control method includes the following steps:

Step S1: according to a color of color shift displayed by the display panel, adjusting a shared voltage signal transmitted by the one of the sharing lines electrically connected to the auxiliary pixel electrodes of the sub-pixels corresponding to the color of color shift, so that the shared voltage signal after the adjusting is different from the shared voltage signal transmitted by the sharing lines electrically connected to the auxiliary pixel electrodes of the sub-pixels with different emission colors.

An embodiment of the present application provides a display panel, the display panel includes a plurality of sub-pixels, wherein each of the sub-pixels includes a main pixel electrode and an auxiliary pixel electrode; a plurality of pixel driving circuits, wherein each of the pixel driving circuits is electrically connected to a corresponding one of the sub-pixels, and each of the pixel driving circuits includes a first transistor, a second transistor, and a third transistor; a plurality of data lines, wherein each of the data lines is connected to a corresponding one of main pixel electrodes through the first transistor, each of the data lines is further electrically connected to a corresponding one of auxiliary pixel electrodes through the second transistor; and a plurality of sharing lines, wherein each of the sharing lines is electrically connected to a corresponding one of the auxiliary pixel electrodes through the third transistor; wherein shared voltage signals transmitted by the sharing lines electrically connected to the auxiliary pixel electrodes of the sub-pixels with different emission colors are at least partially different.

The present application also provides a display device, the display device includes any of the above-mentioned display panels and a backlight unit, and the display panel is connected to the backlight unit.

Compared with the prior art, the present application provides a control method for a display panel, a display panel, and a display device, which adjust a shared voltage signal transmitted by the one of the sharing lines electrically connected to the auxiliary pixel electrodes of the sub-pixels corresponding to a color of color shift according to the color of color shift displayed by the display panel, so that the shared voltage signal after the adjusting is different from the shared voltage signal transmitted by the sharing lines electrically connected to the auxiliary pixel electrodes of the sub-pixels with different emission colors, so as to adjust the pixel voltage of the sub-pixels corresponding to the color of color shift, thereby adjusting the brightness of the sub-pixels corresponding to the color of color shift, so as to alleviate the problem of color shift of the display panel.

DESCRIPTION OF SPECIFIC EMBODIMENTS OF THE INVENTION

In order to make the purpose, technical solution, and effect of the present application clearer and more definite, the present application is further described in detail below with reference to the accompanying drawings and examples. It should be understood that the specific embodiments described herein are only used to explain the present application, and are not used to limit the present application.

Figure 1:
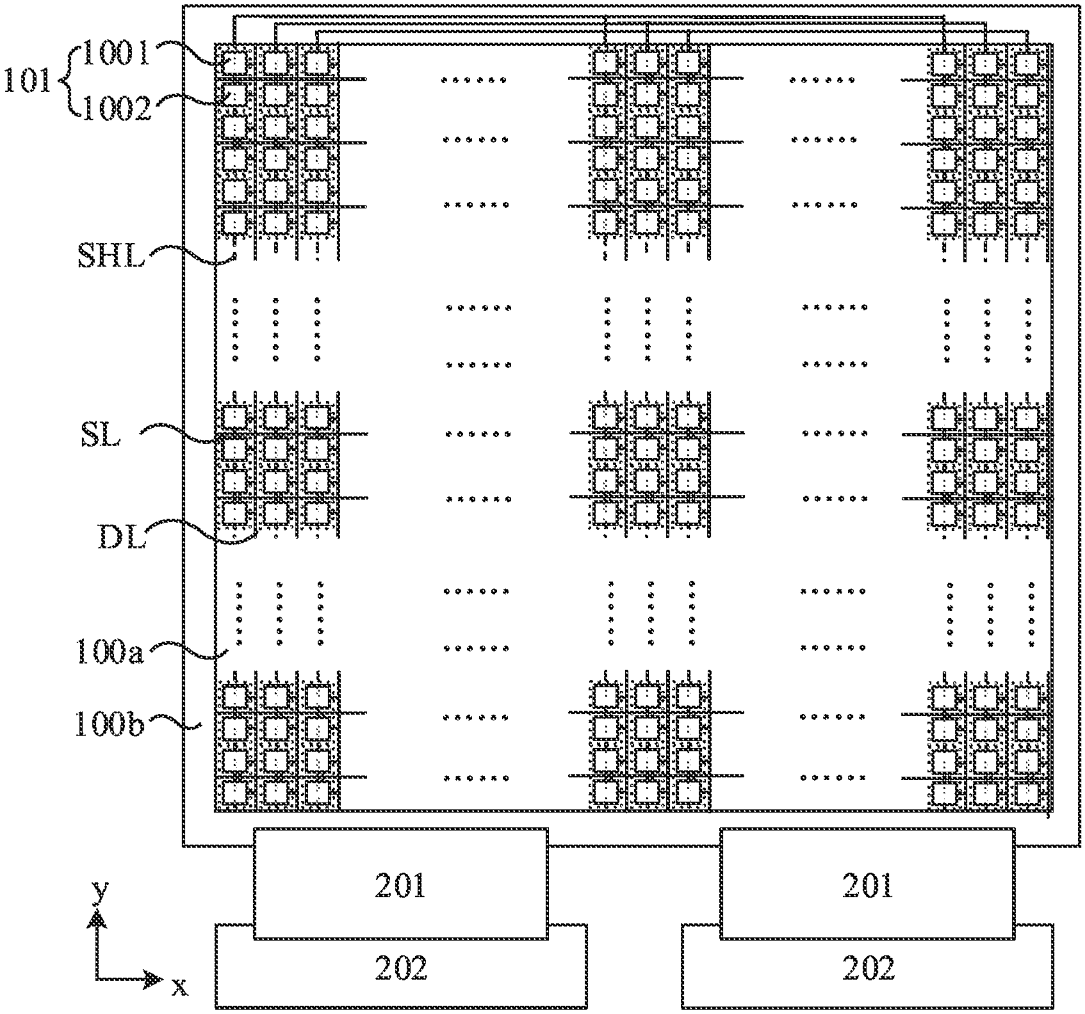
FIG. 1 is a schematic structural diagram of a display panel provided by an embodiment of the present application.

Specifically, FIG. 1 is a schematic structural diagram of a display panel provided by an embodiment of the present application. The display panel includes a display area 100*a* and a non-display area 100*b* located at a periphery of the display area 100*a*. The display panel includes a plurality of pixels, a plurality of pixel driving circuits, a plurality of data lines DL, a plurality of scan lines SL, and a plurality of sharing lines SHL.

The plurality of data lines DL are arranged along a first direction x and extend along a second direction y, and a plurality of data lines DL transmit a plurality of pixel voltages; the plurality of scan lines SL are arranged along the second direction y and extend along the first direction x, and the plurality of scan lines SL transmit a plurality of scan signals.

The sharing line SHL and a plurality of data lines DL are arranged at intervals in the first direction x. A plurality of sharing lines SHL transmit a plurality of shared voltage signals, and each of the sharing lines SHL is electrically connected to at least one of the sub-pixels 101.

The plurality of pixels are located in the display area 100*a*, and each of the pixels includes a plurality of sub-pixels 101. Optionally, the emission colors of the plurality of sub-pixels 101 include red, green, blue, yellow, white, and the like.

Figure 2A:
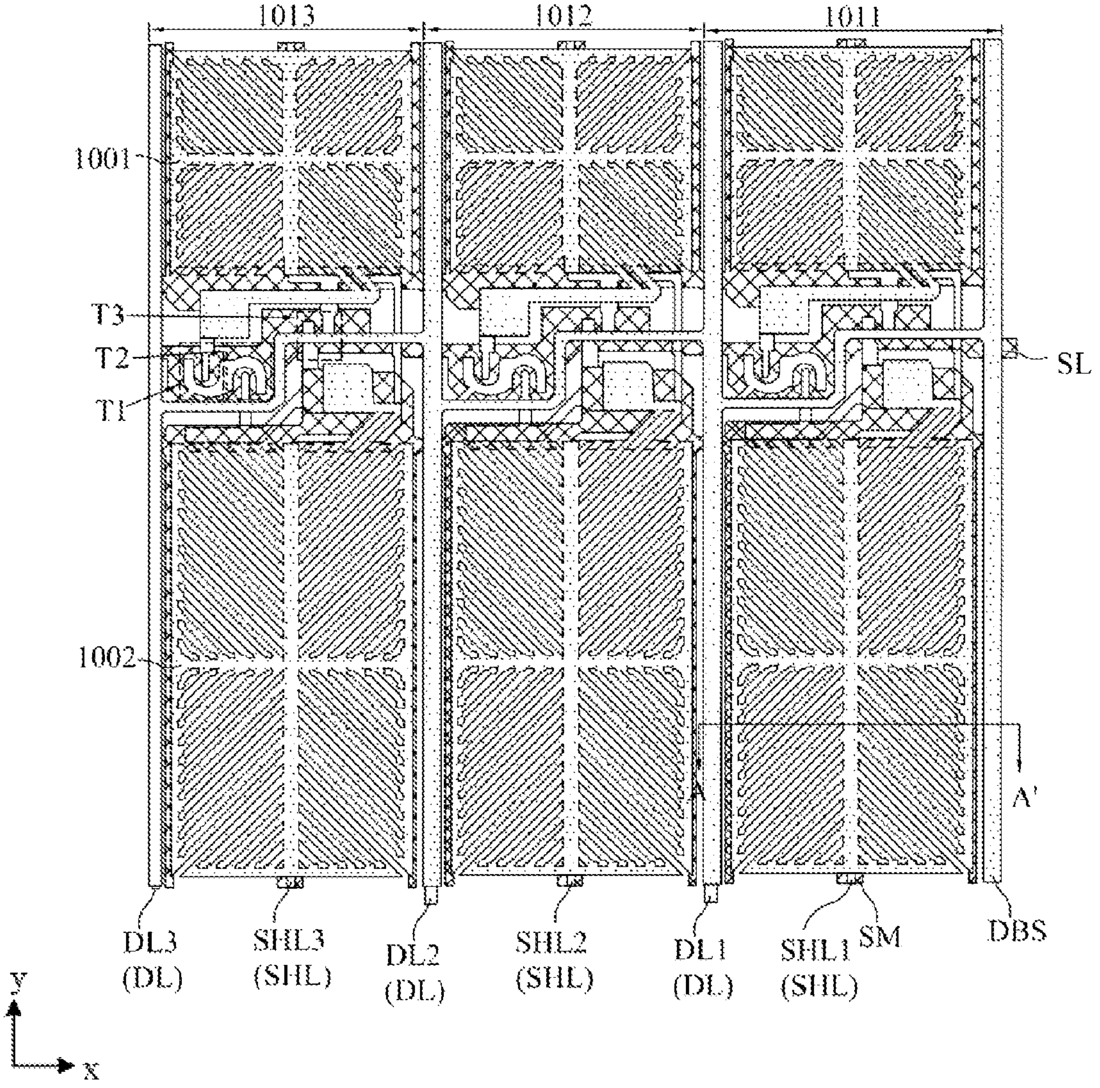
FIG. 2A is a schematic structural diagram of a pixel provided by an embodiment of the present application.

FIG. 2A is a schematic structural diagram of a pixel provided by an embodiment of the present application, and a pixel includes three sub-pixels 101 as an example for illustration, and each of the sub-pixels 101 includes a main sub-pixel and an auxiliary sub-pixel. The main sub-pixel includes a main pixel electrode 1001, and the auxiliary sub-pixel includes an auxiliary pixel electrode 1002. The main pixel electrode 1001 and the auxiliary pixel electrode 1002 of each of the sub-pixels are located on the array substrate of the display panel, and an electric field is formed between the main pixel electrode 1001 and the auxiliary pixel electrode 1002 in each of the sub-pixels 101 and the first electrode layer CFcom on the color filter substrate to control the deflection of liquid crystal molecules in the main sub-pixel and the auxiliary sub-pixel.

Optionally, each of the main pixel electrodes 1001 has a first trunk extending along the second direction y, a third trunk extending along the first direction x, a first branch electrode extending from the first trunk and the third trunk, and a first frame electrode connecting the first trunk, the third trunk, and the first branch electrode; each of the auxiliary pixel electrodes 1002 has a second trunk extending along the second direction y, a fourth trunk extending along the first direction x, a second branch electrodes extending from the second trunk and the fourth trunk, and a second frame electrode connecting the second trunk, the fourth trunk, and the second branch electrode; the first trunk intersects the third trunk, and the second trunk intersects the fourth trunk. The plurality of pixel driving circuits are correspondingly electrically connected to the plurality of sub-pixels 101 to drive the plurality of sub-pixels 101 to emit light according to the scan signals transmitted by the scan lines SL and the pixel voltages transmitted by the data lines DL. The plurality of pixel driving circuits are located on the array substrate of the display panel. Optionally, each of the pixel driving circuits is electrically connected to at least one of the sub-pixels 101.

Figure 2B:
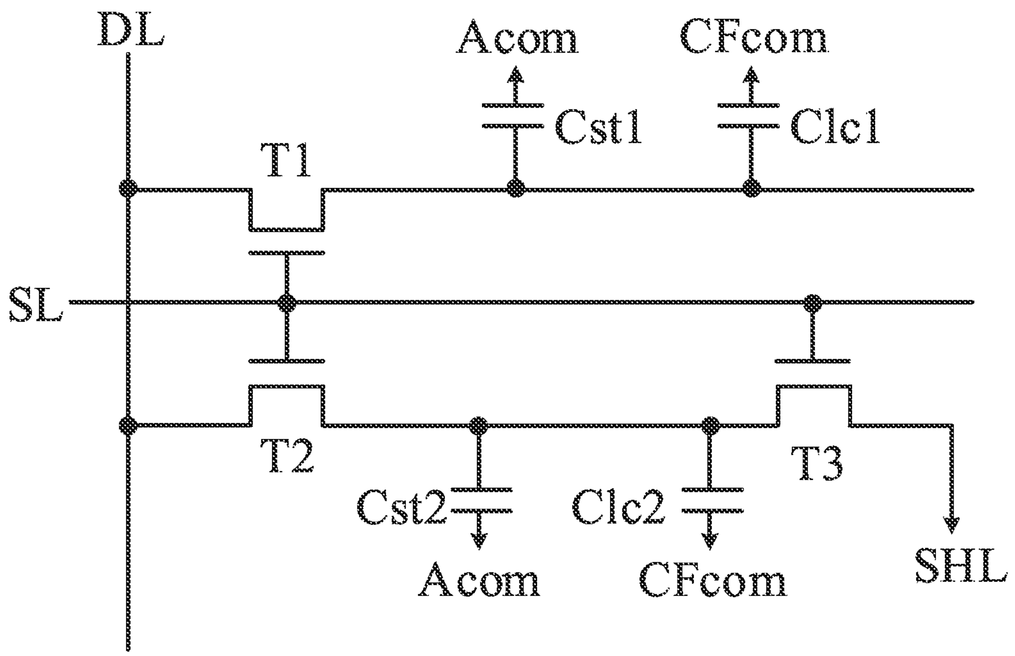
FIG. 2B is an equivalent circuit diagram of an electrical connection between a pixel driving circuits and a sub-pixel provided by an embodiment of the present application.

Optionally, the pixel driving circuits may adopt a design including three transistors. FIG. 2B is an equivalent circuit diagram of the electrical connection between the pixel driving circuits and the sub-pixels provided by the embodiment of the present application. Still referring to FIGS. 2A-2B, each of the pixel driving circuits includes a first transistor T1, a second transistor T2, and a third transistor T3.

The gates of the first transistor T1, the second transistor T2, and the third transistor T3 are all electrically connected to the same corresponding scan line SL, and the source and drain of the first transistor T1 are electrically connected between the corresponding data line DL and the main pixel electrode 1001 of the corresponding sub-pixel 101, so that each of the data lines DL is electrically connected to the main pixel electrode 1001 through the first transistor T1 and the corresponding sub-pixel 101.

The source and the drain of the second transistor T2 are electrically connected between the corresponding data line DL and the corresponding auxiliary pixel electrode 1002 of the sub-pixel 101, so that each of the data lines DL is electrically connected to the auxiliary pixel electrode 1002 of the corresponding sub-pixel 101 through the second transistor T2; and the main pixel electrode 1001 and the auxiliary pixel electrode 1002 of the same sub-pixel 101 are electrically connected to the same data line DL, so that the main sub-pixel and the auxiliary sub-pixel of the same sub-pixel 101 receive the same pixel voltage signal.

The source and the drain of the third transistor T3 are electrically connected between the corresponding sharing line SHL and the corresponding auxiliary pixel electrode 1002 of the sub-pixel 101, so that each of the sharing lines SHL is electrically connected to the auxiliary pixel electrode 1002 of the corresponding sub-pixel 101 through the third transistor T3, and the voltage of the auxiliary pixel electrode 1002 of the sub-pixel 101 is shared through the sharing line SHL.

The main sub-pixel further includes a first liquid crystal capacitor Clc1 and a first storage capacitor Cst1, and the auxiliary sub-pixel further includes a second liquid crystal capacitor Clc2 and a second storage capacitor Cst2. The first liquid crystal capacitor Clc1 may be composed of the main pixel electrode 1001 and the first electrode layer CFcom, the second liquid crystal capacitor Clc2 may be composed of the sub pixel electrode 1002 and the first electrode layer CFcom, and the first electrode layer CFcom has a first common voltage. A terminal of the first storage capacitor Cst1 is connected in series between one of the source or the drain of the first transistor T1 and the second electrode layer Acom, one terminal of the second storage capacitor Cst2 is connected in series between one of the source or drain of the second transistor T2 and the second electrode layer Acom, the second electrode layer Acom may be located on the array substrate, and the second electrode layer Acom has a second common voltage.

The shared voltage signals transmitted by the sharing lines SHL electrically connected to the auxiliary pixel electrodes 1002 of the sub-pixels 101 with different emission colors are at least partially different, so as to adjust the pixel voltages of the auxiliary sub-pixels of at least some of the sub-pixels 101 with different emission colors, thereby adjusting the brightness of at least some of the sub-pixels 101 with different emission colors, thus alleviating the problem of color shift of the display panel.

Optionally, because the color shift of the display panel can be divided into monochromatic color shift (for example, the sub-pixel emission colors include red, green, and blue, and the display panel appears reddish, bluish, or greenish) and multi-color mixing color shift (for example, the sub-pixel emission colors include red, green, and blue, and the display panel appears yellowish or blueish, etc.), the shared voltage signals transmitted by the plurality of sharing lines SHL electrically connected to the auxiliary pixel electrodes 1002 of the sub-pixels 101 with different emission colors may be set to be at least partially different, or may be set to be completely different.

Specifically, the display panel having a monochromatic color shift and each of the pixels including three of the sub-pixels 101 is taken as an example for description. Still referring to FIG. 1 and FIGS. 2A to 2B, the plurality of sub-pixels 101 include a first sub-pixel 1011, a second sub-pixel 1012, and a third sub-pixel 1013 with different emission colors. Optionally, the light emission color of the first sub-pixel 1011 is the color displayed when the display panel has a monochromatic color shift. If the display panel is bluish, the problem of color shift can be alleviated by adjusting the voltage signal transmitted by the sharing line electrically connected to the first sub-pixel 1011 whose emission color is blue; If the display panel is greenish, the problem of color shift can be alleviated by adjusting the voltage signal transmitted by the sharing line electrically connected to the first sub-pixel 1011 whose light emission color is green; and if the display panel is reddish, the problem of color shift can be alleviated by adjusting the voltage signal transmitted by the sharing line electrically connected to the first sub-pixel 1011 whose emission color is red.

Correspondingly, the plurality of sharing lines SHL include a first sharing line SHL1 electrically connected to the auxiliary sub-pixel of the first sub-pixel 1011, a second sharing line SHL2 electrically connected to the auxiliary sub-pixel of the second sub-pixel 1012, and a third sharing line SHL3 that is electrically connected to the auxiliary sub-pixels of the third sub-pixel 1013.

Figure 3:
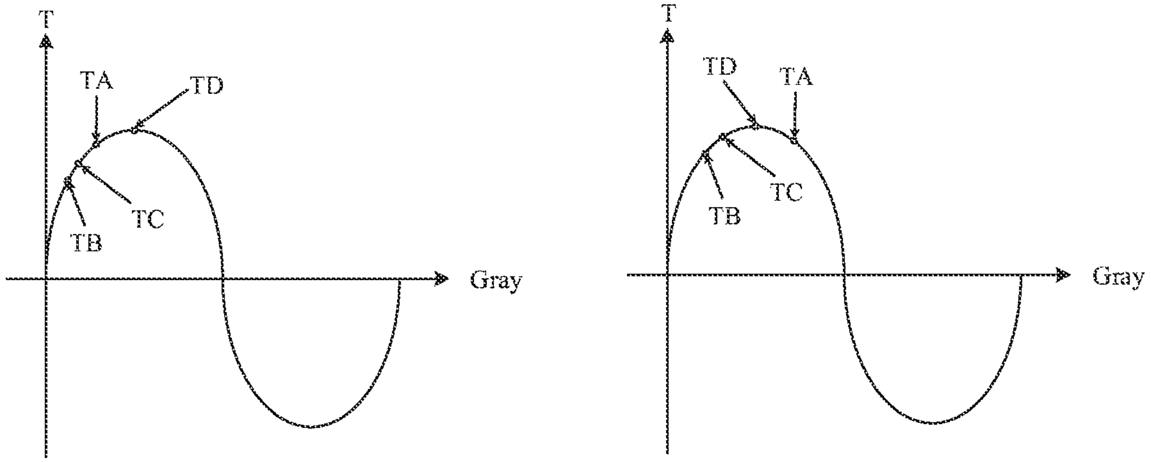
FIG. 3 is a schematic diagram showing a relationship between transmittance and gray scale provided by an embodiment of the present application.

According to the transmittance T=T0*sin 22φ(V)*sin 2[πdΔneff(V)/λ], the transmittance T is inversely proportional to the wavelength λ, wherein TO represents a transmittance of other materials (such as liquid crystal transmittance, film refractive index, reflectivity, etc.); φ(V) represents an azimuth angle of liquid crystal molecules; d represents a thickness of the liquid crystal layer; Δneff (V) represents a difference between a long-axis refractive index and a short-axis refractive index of liquid crystal molecules. As such, a schematic diagram of the relationship between the transmittance and the gray scale is obtained as shown in FIG. 3. The abscissa represents the gray scale Gray, and the ordinate represents the transmittance T. Assuming that the emission colors of the first sub-pixel 1011, the second sub-pixel 1012, and the third sub-pixel 1013 are blue, red, and green in sequence, the wavelength of the light emitted by the second sub-pixel 1012 is greater than the wavelength of the light emitted by the third sub-pixel 1013, and the wavelength of the light emitted by the third sub-pixel 1013 is greater than the wavelength of the light emitted by the first sub-pixel 1011.

As the gray scale increases, the transmittance TA corresponding to the first sub-pixel 1011 will be inverted before the transmittance TB corresponding to the second sub-pixel 1012 and the transmittance TC corresponding to the third sub-pixel 1013, that is, as the gray scale increases, the transmittance TA corresponding to the first sub-pixel 1011 begins to decrease after reaching the maximum value (i.e., the TD point), and the decrease in transmittance will cause the brightness of the first sub-pixel to reduce accordingly, resulting in a deviation in the brightness ratio between the first sub-pixel 1011, the second sub-pixel 1012, and the third sub-pixel 1013, resulting in inaccurate color rendering of the display panel.

Specifically, taking the display panel displaying white as an example, assuming that the tristimulus values of the first sub-pixel 1011 are BX, BY, and BZy, respectively, the tristimulus values of the second sub-pixel 1012 are RX, RY, RZ, respectively, and the tristimulus values of the third sub-pixel 1013 are GX, GY, and GZ, respectively, the white tristimulus values are: WX=BX+RX+GX, WY=BY+RY+GY, and WZ=BZ+RZ+GZ, respectively, and the color coordinates of white are Wx=WX/(WX+WY+WZ), Wy=WY/(WX+WY+WZ), respectively. Since the Y coordinate represents chroma, it also represents chromaticity, and the chroma can be described by brightness, hue, and saturation, a change in BY will cause a change in WY, and the color coordinates Wx and Wy of white will also change accordingly, resulting in inaccurate white color display of the display panel. Similarly, the display information of other colors obtained by mixing the first sub-pixel 1011, the second sub-pixel 1012, and the third sub-pixel 1013 will also deviate, resulting in a problem of color shift on the display panel.

In the present application, the first shared voltage signal transmitted by the first sharing line SHL1 and the second shared voltage signal transmitted by the second sharing line SHL2 are different, and the first shared voltage signal transmitted by the first sharing line SHL1 is different from the third shared voltage signal transmitted by the third sharing line SHL3, the pixel voltage of the auxiliary sub-pixel of the first sub-pixel 1011 can be adjusted so that the transmittance TA of the first sub-pixel 1011 is not reversed as the gray scale increases, so as to adjust the brightness of the first sub-pixel 1011 and alleviate the problem of color shift of the display panel.

Figure 4A:
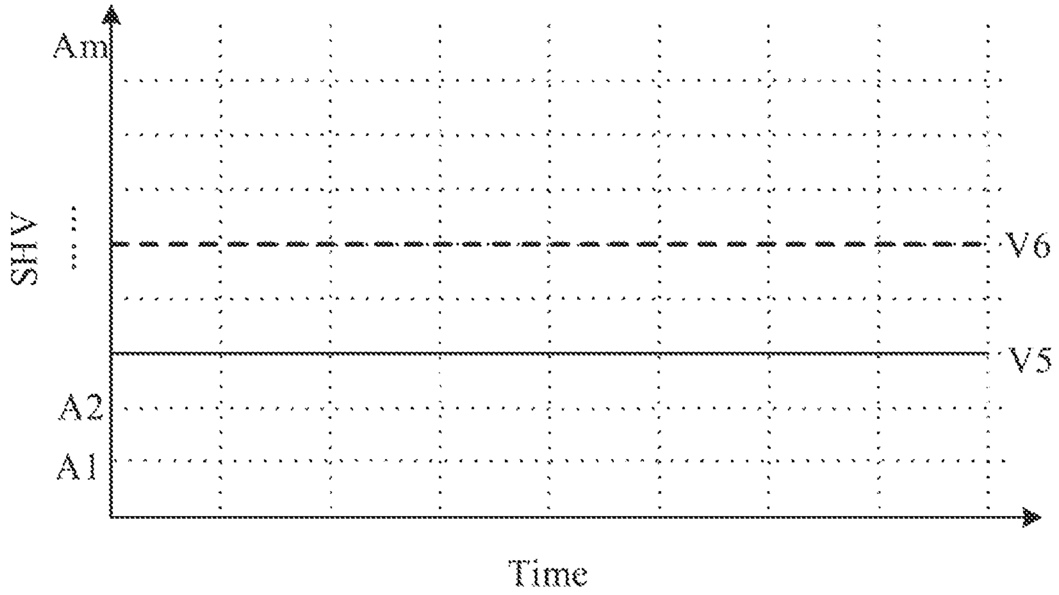
FIG. 4A to FIG. 4B are schematic diagrams of voltage values of a shared voltage signal under a same gray scale provided by an embodiment of the present application.
Figure 4B:
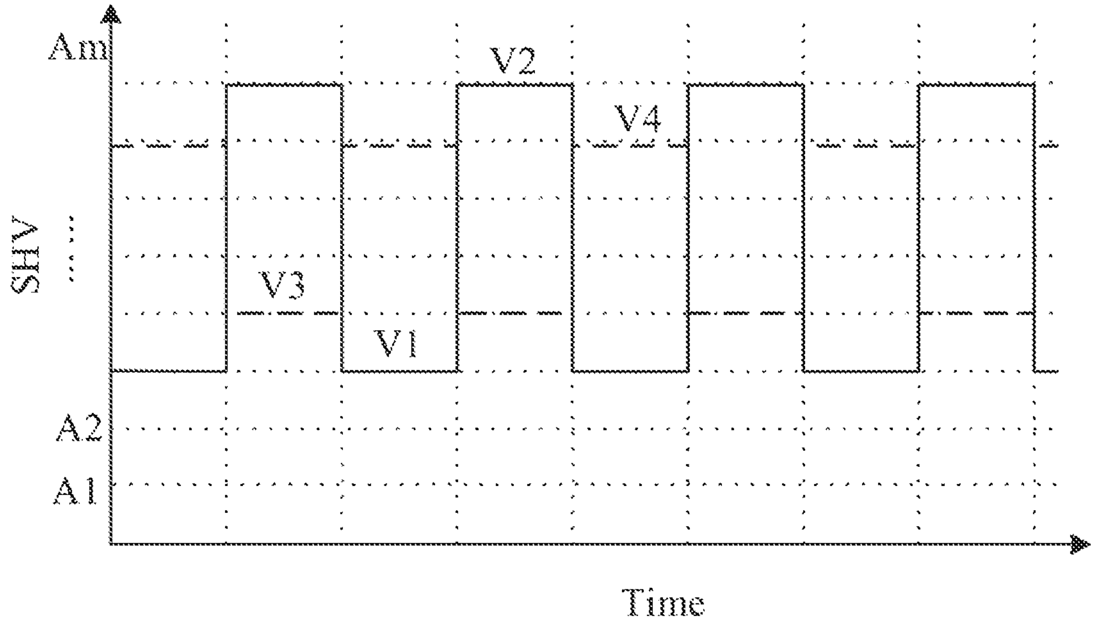
Figure 5:
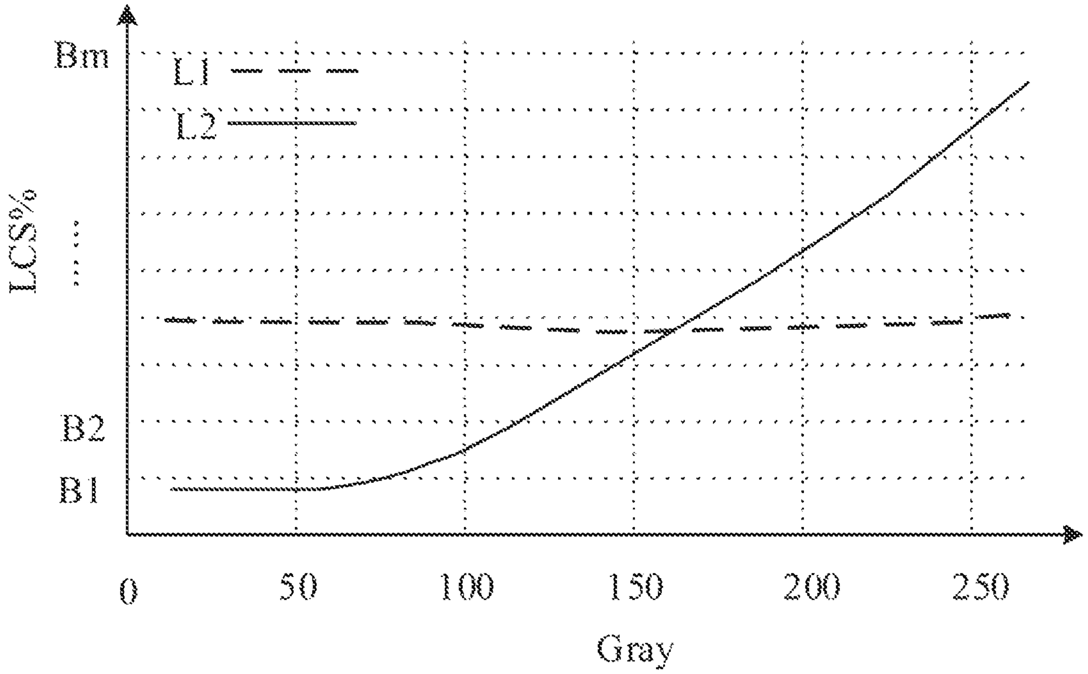
FIG. 5 is a schematic diagram of a pixel voltage ratio between a main sub-pixel and an auxiliary sub-pixel under different gray scales provided by an embodiment of the present application.

Optionally, a plurality of shared voltage signals may be direct current signals or alternating current signals, as shown in FIG. 4A to FIG. 4B, which are schematic diagrams of voltage values of a shared voltage signal under a same gray scale provided by an embodiment of the present application; and as shown in FIG. 5, which is a schematic diagram of a pixel voltage ratio between a main sub-pixel and an auxiliary sub-pixel under different gray scales provided by an embodiment of the present application.

The abscissa in FIG. 4A and FIG. 4B represents a change of a pixel voltage polarity at different times; the ordinate SHV represents a shared voltage signal, and A1, A2 . . . , and Am represent numerical variation ranges of the shared voltage signals under the same grayscale, and according to different display panel types, the values represented by A1, A2 . . . , and Am are also different. The numerical variation ranges of the shared voltage signals are related to a degree of color shift that occurs on the display panel, that is, the greater the degree of color shift that occurs on the display panel, the larger the numerical variation range of the shared voltage signals. It is appreciated that, under different gray scales, the variation ranges of the shared voltage signals are also different. The ordinate LCS in FIG. 5 represents a ratio of the pixel voltage of the main sub-pixel to the pixel voltage of the auxiliary sub-pixel of the same sub-pixel, and B1, B2 . . . , and Bm represent a numerical variation ranges of a ratio of the pixel voltage of the main sub-pixel and the pixel voltage of the auxiliary sub-pixel in the same sub-pixel; and the values represented by B1, B2 . . . , and Bm are different according to different display panel types, and the abscissa Gray represents a variation range of the grayscale value. In FIG. 5, L1 is a change curve of the ratio of the pixel voltage of the main sub-pixel to the pixel voltage of the auxiliary sub-pixel under different gray-scale states obtained when the shared voltage signal is a DC voltage with a voltage value of 4V; L2 is a change curve of the ratio of the pixel voltage of the main sub-pixel to the pixel voltage of the auxiliary sub-pixel under different gray-scale states obtained when the shared voltage signal is 4V under the positive pixel voltage, and when the shared voltage signal is 12V under the negative pixel voltage.

Specifically, if the shared voltage signals transmitted by the plurality of sharing lines SHL are DC signals, the shared voltage signals transmitted by the first sharing line SHL1 electrically connected to the first sub-pixel 1011 have a fifth voltage V5, the shared voltage signal transmitted by the second sharing line SHL2 electrically connected to the second sub-pixel 1012 has a sixth voltage V6; and the shared voltage signal transmitted by the third sharing line SHL3 electrically connected to the third sub-pixel 1013 has a seventh voltage. The fifth voltage V5 is smaller than the sixth voltage V6, as shown in FIG. 4A, so that the first sub-pixel 1011 divides the pixel voltage of the auxiliary sub-pixel of the first sub-pixel 1011 through the fifth voltage V5 provided by the first sharing line SHL1 and the third transistor T3, and the pixel voltage of the auxiliary sub-pixel of the first sub-pixel 1011 is lower than the pixel voltage of the auxiliary sub-pixel of the second sub-pixel 1012, thereby adjusting the difference in brightness between the first sub-pixel 1011 and the second sub-pixel 1012, thus alleviating the problem of monochromatic color shift of the display panel.

Optionally, the fifth voltage V5 is smaller than the seventh voltage. Optionally, when the display panel only has the problem of monochromatic color shift, the sixth voltage V6 may be equal to the seventh voltage.

Since the auxiliary sub-pixel realizes the adjustment of the pixel voltage of the auxiliary sub-pixel through the sharing line SHL and the third transistor T3, it can be deduced that: $Vp-Vq=(Q/C)-(\Delta Q/C)$, $\Delta Q-\Delta V/Rt$, wherein Vp represents the charging voltage. Vq represents the voltage value after the sub-pixel voltage is reduced by the action of the third transistor T3, Q represents the charging charge, C represents the capacitance, ΔQ represents a voltage difference between the pixel voltages of the auxiliary sub-pixels, ΔV represents a voltage difference between the pixel voltage transmitted by the data line and the shared voltage signal transmitted by the sharing line, and Rt represents a equivalent resistance of the third transistor T3. When the shared voltage signal is a DC voltage, ΔV corresponding to a low gray scale is smaller, so that ΔQ is also smaller accordingly, and the voltage drop is smaller, resulting in a small difference in deflection angles of the liquid crystal molecules in the auxiliary sub-pixels and the main sub-pixel of the sub-pixel 101 at a low gray scale, so that the display panel has the problem of limited viewing angle range; while when the gray scale is high, the ΔV corresponding to high gray scale is large, so that ΔQ is also larger accordingly, and the voltage drop is larger, resulting in a large difference in deflection angles of the liquid crystal molecules in the auxiliary sub-pixels and the main sub-pixel of the sub-pixel 101 at a high gray scale, but the transmittance is not high. That is, when the plurality of shared voltage signals transmitted by the plurality of sharing lines SHL are DC signals, in each of the sub-pixels 101, the ratio of the pixel voltage of the main sub-pixel to the pixel voltage of the auxiliary sub-pixel increases with decrease in the gray scale value instead, as indicated by L1 in FIG. 5. Therefore, in order to alleviate the problem of the limited viewing angle range of the display panel at low gray scales and the problem of low transmittance of the display panel at high gray scales, the plurality of shared voltage signals transmitted by the plurality of sharing lines SHL are AC Signal.

Optionally, the pixel voltages transmitted by the plurality of data lines DL have positive or negative polarity. Therefore, the shared voltage signal can be adjusted in combination with the positive or negative polarity of the pixel voltage, so that the plurality of shared voltage signals transmitted by the plurality of sharing lines SHL are AC signals.

Further, in the data line and the sharing line SHL electrically connected to the same sub-pixel 101, when the pixel voltage transmitted by the sharing line SHL corresponding to the data line DL is positive, the transmitted shared voltage signal is smaller than the transmitted shared voltage signal when the pixel voltage transmitted by the sharing line SHL corresponding to the data line DL is negative.

Specifically, still referring to FIG. 1, FIG. 2A, and FIG. 4B, the plurality of data lines DL include a first data line DL1 electrically connected to the first sub-pixel 1011, a second data line DL2 electrically connected to the second sub-pixel 1012, and a third data line DL3 electrically connected to the third sub-pixel 1013.

The voltage of the first shared voltage signal transmitted by the sharing line SHL1 electrically connected to the first sub-pixel 1011 has a first relative voltage with respect to the pixel voltage transmitted by the first data line DL1 electrically connected to the first sub-pixel 1011; the voltage of the shared voltage signal transmitted by the second sharing line SHL2 electrically connected to the second sub-pixel 1012 has a second relative voltage with respect to the pixel voltage transmitted by the second data line DL2 electrically connected to the second sub-pixel 1012; and the voltage of the shared voltage signal transmitted by the third sharing line SHL3 electrically connected to the third sub-pixel 1013 has a third relative voltage with respect to the pixel voltage transmitted through the third data line DL3 electrically connected to the third sub-pixel 1013. The first relative voltage is greater than the second relative voltage, so that the voltage at which the first sharing line SHL1 performs voltage sharing with the auxiliary sub-pixels of the first sub-pixel 1011 is greater than the voltage at which the sharing line SHL2 performs voltage sharing with the auxiliary sub-pixels of the second sub-pixel 1012, and thereby the pixel voltage of the auxiliary sub-pixel of the first sub-pixel 1011 is lower than the pixel voltage of the auxiliary sub-pixel of the second sub-pixel 1012, and the brightness difference between the first sub-pixel 1011 and the second sub-pixel 1012 is then adjusted to alleviate the problem of monochromatic color shift of the display panel.

Optionally, the first relative voltage is greater than the third relative voltage. Optionally, when the display panel has only the problem of monochromatic color shift, the second relative voltage is equal to the third relative voltage.

Further, when the pixel voltage transmitted by the first data line DL1 electrically connected to the first subpixel 1011 is positive, the shared voltage signal transmitted by the first sharing line SHL1 electrically connected to the first subpixel 1011 has a first voltage V1; and when the pixel voltage transmitted by the first data line DL1 electrically connected to the first sub-pixel 1011 is negative, the shared voltage signal transmitted by the first sharing line SHL1 electrically connected to the first sub-pixel 1011 has a second voltage V2.

When the pixel voltage transmitted by the second data line DL2 electrically connected to the second sub-pixel 1012 is positive, the shared voltage signal transmitted by the second sharing line SHL2 electrically connected to the second sub-pixel 1012 has a third voltage V3; and when the pixel voltage transmitted by the second data line DL2 electrically connected to the second sub-pixel 1012 is negative, the shared voltage signal transmitted by the second sharing line SHL2 electrically connected to the second sub-pixel 1012 has a fourth voltage V4.

When the pixel voltage transmitted by the third data line DL3 electrically connected to the third sub-pixel 1013 is positive, the shared voltage signal transmitted by the third sharing line SHL3 electrically connected to the third sub-pixel 1013 has an eighth voltage; and when the pixel voltage transmitted by the third data line DL3 electrically connected to the third sub-pixel 1013 is negative, the shared voltage signal transmitted by the third sharing line SHL3 electrically connected to the third sub-pixel 1013 has a ninth voltage.

The first voltage V1 is lower than the third voltage V3, and the second voltage V2 is greater than or equal to the fourth voltage V4, so that the pixel voltage of the auxiliary sub-pixel of the first sub-pixel 1011 is different from the pixel voltage of the auxiliary sub-pixel of the second sub-pixel 1012, so that the liquid crystal molecules in the auxiliary sub-pixel of the first sub-pixel 1011 have different deflection angles from the liquid crystal molecules in the auxiliary sub-pixel of the second sub-pixel 1012, the brightness difference between the first sub-pixel 1011 and the second sub-pixel 1012 is adjusted, and the neutralization of the display effect is achieved by using the shared voltage signal corresponding to the positive and negative polarities of the pixel voltage transmitted by the data line DL, thereby alleviating the problem of color shift of the display panel.

Optionally, the first voltage V1 is lower than the eighth voltage, and the second voltage V2 is lower than the ninth voltage. Optionally, when the display panel has only the problem of monochromatic color shift, the eighth voltage may be equal to the third voltage V3, and the ninth voltage may be equal to the fourth voltage V4.

Optionally, the difference between the third voltage V3 and the first voltage V1 is greater than 0V and less than or equal to 5V to prevent the difference between the third voltage V3 and the first voltage V1 from being too large, the display effect of the display panel corresponding to the pixel voltage transmitted by the data line DL is significantly different between positive polarity and negative polarity, resulting in the problem of flickering of the display panel. Optionally, the difference between the third voltage V3 and the first voltage V1 is equal to 0.1V. 0.2V, 0.3V, 0.4V, 0.5V, 0.6V, 0.7V, Optionally, the difference between the second voltage V2 and the fourth voltage V4 is greater than or equal to 0V and less than or equal to 5V, so as to prevent the difference between the second voltage V2 and the fourth voltage V4 from being too large, the display effect of the display panel corresponding to the pixel voltage transmitted by the data line DL is significantly different between positive polarity and negative polarity, resulting in the problem of flickering of the display panel. Optionally, the difference between the second voltage V2 and the fourth voltage V4 is equal to 0V, 0.1V, 0.2V, 0.3V, 0.4V, 0.5V, 0.6V, 0.7V, 0.8V, 0.9V, 1V, 1.1V, 1.2V, . . . , 2V, . . . . , 2.5V, . . . , 3V, . . . , 4.6V, 4.7V, 4.8V, 4.9V, 5V.

Further, the first voltage V1 is smaller than the second voltage V2, the third voltage V3 is smaller than the fourth voltage V4, and the eighth voltage is smaller than the ninth voltage, so as to adjust the voltage value of the shared voltage signal corresponding a positive pixel voltage or a negative pixel voltage, so that the positive auxiliary sub-pixel of the sub-pixel 101 has a pixel voltage different from the negative auxiliary sub-pixel of the sub-pixel 101, so as to adjust the pixel voltage ratio of the main sub-pixel and the auxiliary sub-pixel of the sub-pixel 101, making the pixel voltage ratio of the main sub-pixel and the auxiliary sub-pixel of the sub-pixel 101 increase with the increase of the gray scale value. As shown by L2 in FIG. 5 (that is, when the shared voltage signal is an AC voltage, the ΔV corresponding to the low gray scale and the high gray scale changes), the ΔQ corresponding to the low gray scale and the high gray scale is equal, so that the liquid crystal molecules of the main sub-pixel and the liquid crystal molecules in the auxiliary sub-pixel have a large deflection angle difference when the display panel realizes low grayscale display, so that the display panel has a large deflection angle when low grayscale display is performed; and the liquid crystal molecules of the main sub-pixel and the liquid crystal molecules in the auxiliary sub-pixel have a small deflection angle difference when the display panel realizes high grayscale display. As such, the transmittance of the auxiliary sub-pixel is approximately equal to the transmittance of the main sub-pixel, so that the display panel can obtain a greater transmittance, thereby increasing the transmittance while improving the viewing angle.

Optionally, the difference between the pixel voltage transmitted by the data line DL electrically connected to the auxiliary sub-pixel of the first sub-pixel 1011 and the shared voltage signal transmitted by the sharing line SHL can be adjusted. The voltage difference between the third transistor T3 and the auxiliary pixel electrode 1002 is kept unchanged, so as to adjust the divided voltage of the third transistor T3 and the pixel voltage on the auxiliary sub-pixel of the first sub-pixel 1011 alleviates the color shift of the display panel. Further, the required shared voltage signals can be provided respectively to the first sharing line SHL1, the second sharing line SHL2, and the third sharing line SHL3 directly through the driving module. The display panel includes the driving module, and the driving module provides the display panel with various control signals for display.

Optionally, the display panel further includes an AC voltage source, and the AC voltage source is electrically connected to the plurality of sharing lines SHL, so as to provide a required shared voltage signal to the plurality of sharing lines SHL. Since the AC voltage source is electrically connected to the plurality of sharing lines SHL, the sharing lines SHL can have different voltage values when the corresponding pixel voltage has positive polarity and has negative polarity, which is convenient for realizing the purpose that the ratio between the pixel voltage of the main sub-pixel and the pixel voltage of the auxiliary sub-pixel is lower at low gray scales and higher at high gray scales in each of the sub-pixels 101, thereby alleviating the problems of limited viewing angle range of the display panel in low gray scales and low transmittance of the display panel in high gray scales, that is, the transmittance can be improved while improving the viewing angle.

In addition, the pixel voltage of the sub-pixel can also be changed by setting a resistor, and then the light-emitting brightness of the sub-pixel can be adjusted to alleviate the problem of color shift of the display panel.

Figure 6:
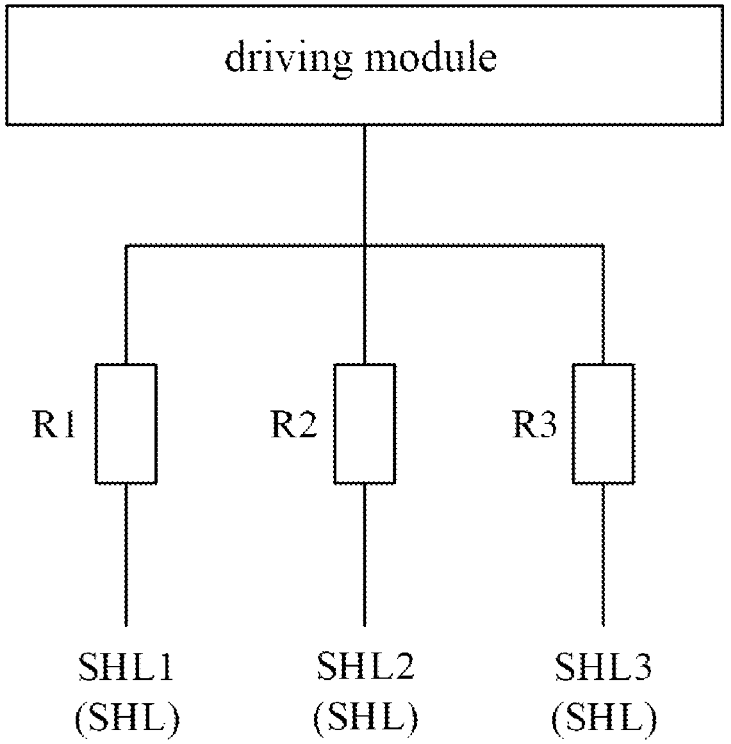
FIG. 6 is a schematic structural diagram of a resistor electrically connected to a driving module and a sharing line provided by an embodiment of the present application.

Specifically, FIG. 6 is a schematic structural diagram of a resistor electrically connected to a driving module and a sharing line provided by an embodiment of the present application. The display panel further includes a plurality of resistors, and each of the resistors is connected in series between the sharing lines SHL and the driving module.

Further, the plurality of resistors include a first resistor R1 and a second resistor R2; the first resistor R1 is connected in series between the driving module and the first sharing line SHL1 electrically connected to the first sub-pixel 1011; the second resistor R2 is connected in series between the driving module and the second sharing line SHL2 electrically connected to the second sub-pixel 1012.

The resistance value of the first resistor R1 is greater than the resistance value of the second resistor R2, so that the voltage shared by the third transistor T3 electrically connected to the auxiliary sub-pixels of the first sub-pixel 1011 and the first sharing line SHL1 is larger, thereby reducing the pixel voltage of the auxiliary sub-pixels of the first sub-pixel 1011 and adjusting the difference in brightness between the first sub-pixel 1011 and the second sub-pixel 1012.

Optionally, a plurality of resistors may further include a third resistor R3 connected in series between the driving module and the third sharing line SHL3, and the resistance value of the third resistor R3 may be set according to actual requirements.

Optionally, in order to save process steps and manufacturing costs, and reduce design complexity, a plurality of resistors may be integrated into the driving module. Specifically, still referring to FIG. 1, the driving module includes a flexible circuit board 201 and a printed circuit board 202, and the flexible circuit board 201 is electrically connected between the printed circuit board 202 and the display panel. Optionally, the flexible circuit board 201 includes a chip on film. A plurality of resistors are located on the printed circuit board 202 to prevent changing the mask used in the panel when the resistors are arranged in the display panel, thereby increasing the manufacturing cost and design difficulty.

Optionally, the resistance of the sharing line SHL can be increased by using a wire with a larger resistivity to adjust the pixel voltage of the auxiliary sub-pixel, and then adjust the light-emitting brightness of the sub-pixel to alleviate the problem of color shift of the display panel. Optionally, in the display area 100*a* and/or the non-display area 100*b*, a part of at least one sharing line SHL can be replaced with a line with a larger resistivity, so as to increase the resistance of the sharing line SHL.

Figure 7A:
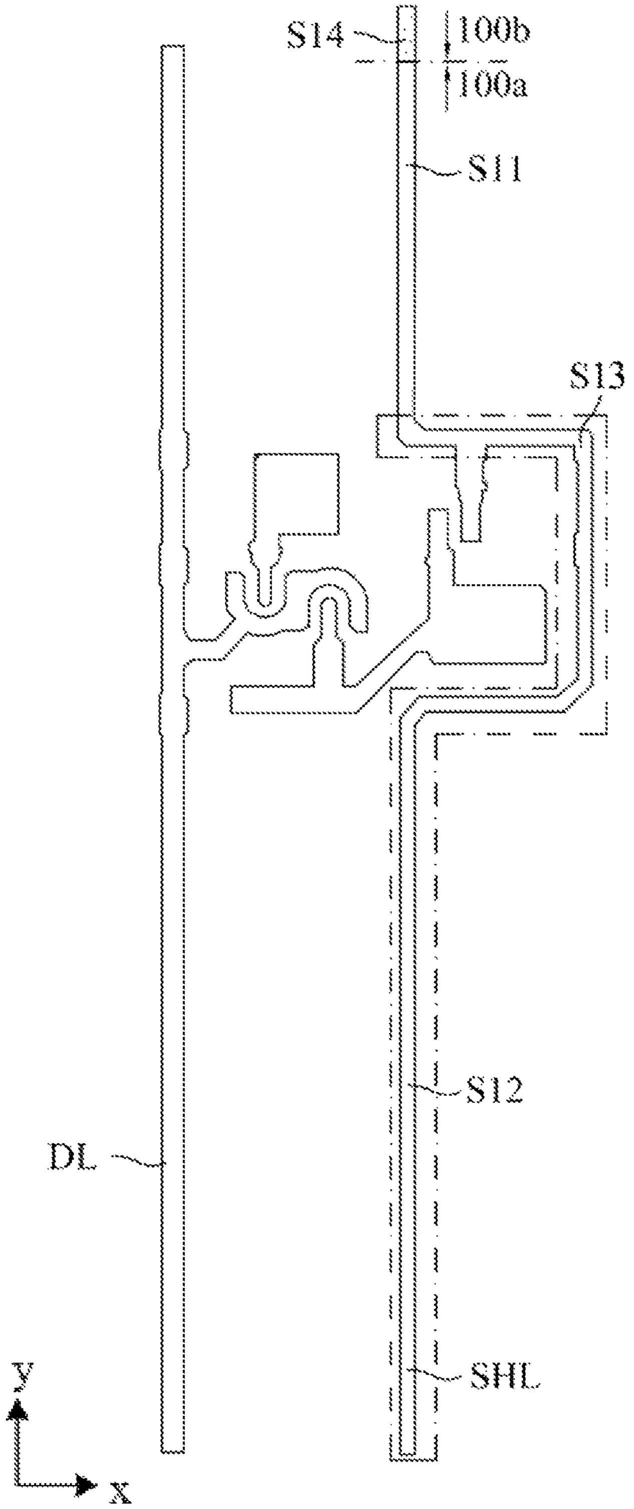
FIG. 7A to FIG. 7B are schematic structural diagrams of a first line connecting a fourth line according to an embodiment of the present application.
Figure 7B:
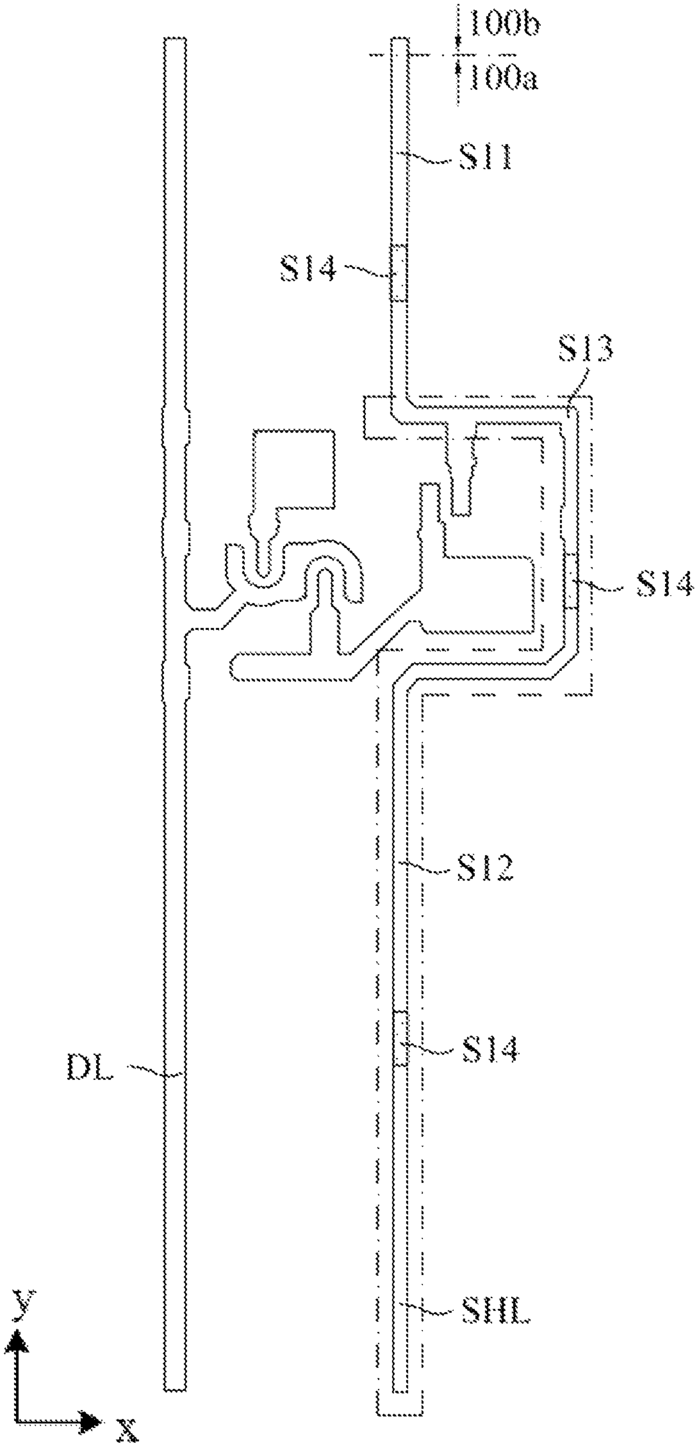
Figure 8:
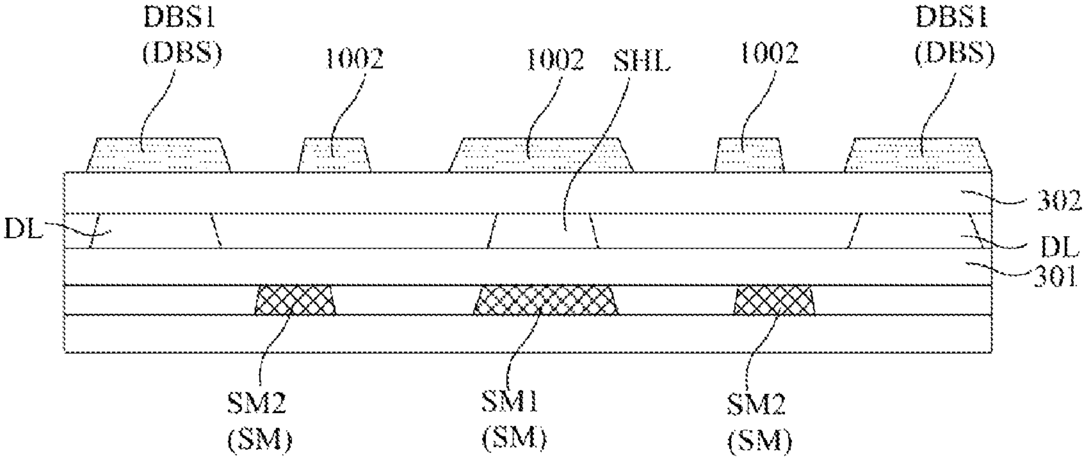
FIG. 8 is a cross-sectional view of a display panel taken along line A-A' in FIG. 2.

Specifically, FIG. 7A to FIG. 7B are schematic structural diagrams of a first line connecting a fourth line according to an embodiment of the present application, and FIG. 8 is a cross-sectional view of a display panel taken along the line A-A' in FIG. 2A. As shown in FIG. 2A, FIGS. 7A-7B and FIG. 8, each of the sharing lines SHL includes a first line s11, a second line s12, and a third line s13 located in the display area 100*a*, the first line s11 and the second line s12 extend along the second direction y and are arranged in parallel with the data line DL, and the third line s13 is electrically connected to the first line s11 and the second line s13. An orthographic projection of the first line s11 on the first trunk is located in the first trunk, an orthographic projection of the second line s12 on the second trunk is located in the second trunk, and the third lines s13 are located between the auxiliary pixel electrode 1002 and the main pixel electrode 1001 of each of the sub-pixels 101.

Optionally, the first line s11, the second line s12 and the third line s13 may be located in a same layer as the scan line SL. However, since a plurality of scan lines SL are arranged along the second direction y and extend along the first direction x, in order to prevent the first line s11, the second line s12, and the third line s13 from a short circuit with the scan lines SL, and the first line s11, the second line s12, and the third line s13 need to be switched when setting, which is not conducive to the manufacturing process on the one hand, and the resistance of the sharing line SHL will increase with the increase of the number of line changes; and on the other hand, there will be a problem of light leakage from the side view under a large viewing angle, resulting in aggravated color shift.

Optionally, the first line s11, the second line s12, and the third line s13 are located in a same layer as the data line DL.

At least one of the sharing lines SHL further includes a fourth line s14 electrically connected to at least one of the first line s11, the second line s12, and the third line s13. The square resistance of the fourth line s14 is greater than the square resistance of the first line s11. Further, the first sharing line SHL1 includes the fourth line s14, so as to increase the resistance of the first sharing line SHL1 through the fourth line s14, thereby reducing the pixel voltage of the auxiliary sub-pixel, and thus alleviating a difference in brightness between the first sub-pixel 1011, the second sub-pixel 1012, and the third sub-pixel 1013.

Optionally, the fourth line s14 may be located in the non-display area 100*b*, as shown in FIG. 7A, or may be located in the display area 100*a*, as shown in FIG. 7B. The fourth line s14 is electrically connected to at least one of the first line s11, the second line s12, and the third line s13. That is, at least one of the sharing lines SHL can be provided with the fourth line s14 at any position of the first line s11, the second line s12, and the third line s13. Optionally, the second sharing line SHL2 and the third sharing line SHL3 may also include the fourth line s14. Further, the fourth line s14 included in the first sharing line SHL1, the fourth line s14 included in the second sharing line SHL2, and the fourth line s14 included in the third sharing line SHL3 may have different lengths, widths, shapes, etc., so that the first sharing line SHL1, the second sharing line SHL2, and the third sharing line SHL3 have different resistance values, respectively.

Optionally, the material of the fourth line s14 includes indium tin oxide (ITO, $In_2O_3$: Sn), aluminum-doped zinc oxide (AZO, ZnO: Al), fluorine-doped tin oxide (FTO, $SnO_2$: F), antimony-doped tin oxide (ATO, $Sn_2O$: Sb), and conductive oxide films (including CdO, $In_2O_3$, $SnO_2$ and ZnO, etc.).

Optionally, the fourth line s14 is in a different layer from the main pixel electrode 1001 and the auxiliary pixel electrode 1002. Specifically, still referring to FIG. 8, the display panel includes a first insulating layer 301, a second insulating layer 302, a color resist layer, and a third insulating layer. The first insulating layer 301 is located under the data line DL, the second insulating layer 302 is located on the data line DL, the color resist layer is located on the second insulating layer 302, and the third insulating layer is located on the color resist layer, and the main pixel electrode 1001 and the auxiliary pixel electrode 1002 are located on the third insulating layer. The fourth line s14 is located between the third insulating layer and the color resist layer, and the fourth line s14 is electrically connected to at least one of the first line s11, the second line s12, and the third line s13 through the via hole penetrating the second insulating layer 302 and the third insulating layer. The color resist layer includes color resist units corresponding to the main pixel electrode 1001 and the auxiliary pixel electrode 1002. Further, in order to prevent the color resistance unit of the color resist layer from impact caused by switching the line from the first line s11 to the fourth line s14, or switching the line from the second line s12 to the fourth line s14, and the fourth line s14 can be switched at any position of the third line s13.

Since the first line s11, the second line s12, the third line s13, and the fourth line s14 are in different layers, the line switched is required to realize the electrical connection of the fourth line s14 to the first line s11, the second line s12, and the third line s13. The electrical connection of the three wires s13, and the length of the shared wire SHL is also increased in the process of line switching, so the resistance of the shared wire SHL may also be increased.

Optionally, the preparation materials of the main pixel electrode 1001 and the auxiliary pixel electrode 1002 include indium tin oxide (ITO, $In_2O_3$: Sn), aluminum-doped zinc oxide (AZO, ZnO: Al), fluorine-doped tin oxide (FTO, $SnO_2$: F), antimony-doped tin oxide (ATO, $Sn_2O$: Sb), and conductive oxide films (including CdO, $In_2O_3$, $SnO_2$ and ZnO, etc.). The preparation material of the data line DL includes at least one of copper, aluminum, silver, or the like.

Figure 9:
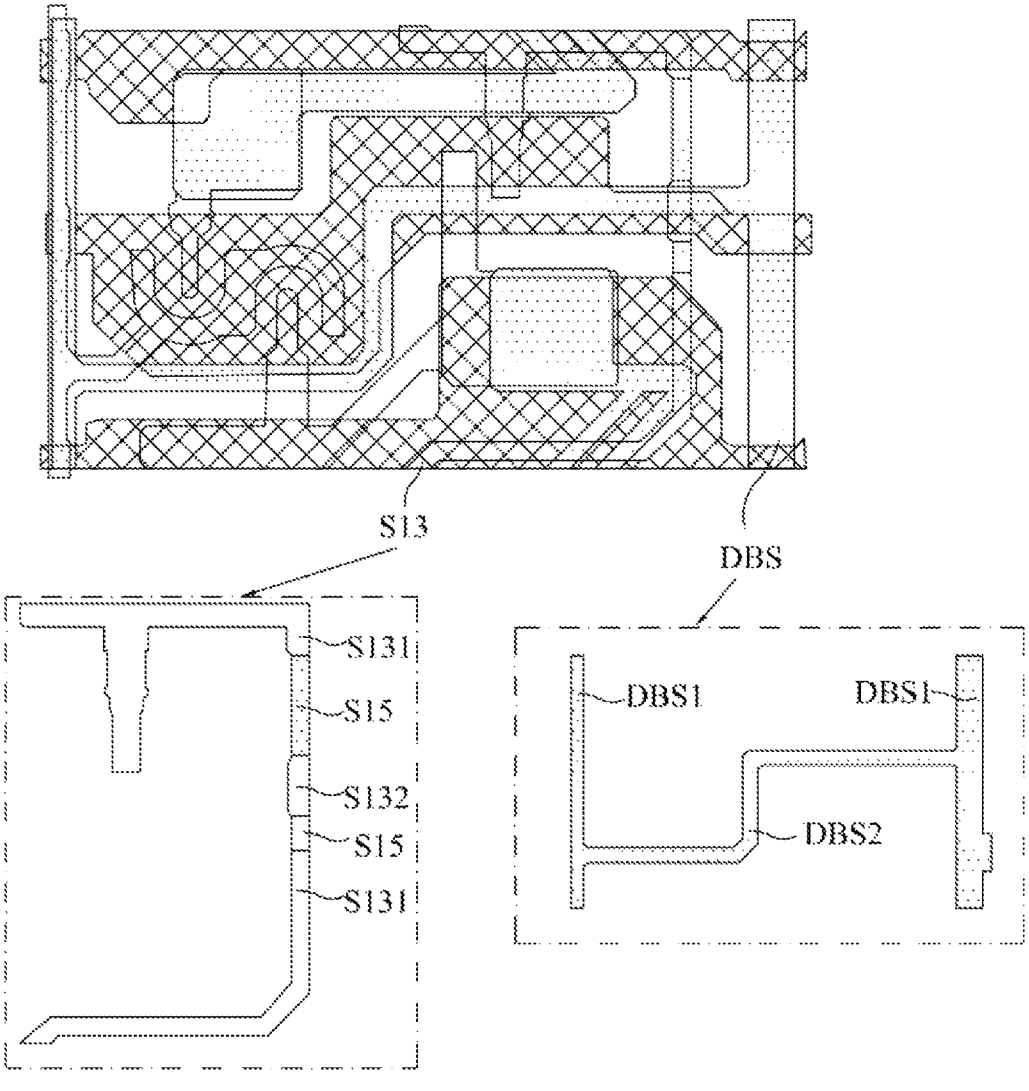
FIG. 9 is a schematic diagram of a connection structure of a fifth line and a third line provided by an embodiment of the present application.

Specifically, FIG. 9 is a schematic diagram of the connection structure between the fifth line and the third line provided by the embodiment of the present application. The third line s13 further includes a first sub-section s131 and a second sub-section s132 arranged at intervals. At least one of the sharing line SHL further includes a fifth line s15 located in the display area 100*a* and between the main pixel electrode 1001 and the auxiliary pixel electrode 1002, and both ends of the fifth line s15 are electrically connected to the first subsection s131 and the second subsection s132. The square resistance of the fifth line s15 is greater than the square resistance of the third line s13. Optionally, the fifth line s15 is located in a same layer as the main pixel electrode 1001 and the auxiliary pixel electrode 1002.

Further, the first sharing line SHL1 includes the fifth line s15, so as to increase the resistance of the first sharing line SHL1 through the fifth line s15, so as to change the pixel voltage of the sub-pixel, and then alleviating a difference in brightness between the first sub-pixel 1011, the second sub-pixel 1012, and the third sub-pixel 1013.

Optionally, the second sharing line SHL2 and the third sharing line SHL3 may also include the fifth line s15. Further, the fifth line s15 included in the first sharing line SHL1, the fifth line s15 included in the second sharing line SHL2, and the fifth line s15 included in the third sharing line SHL3 may have different lengths, widths, shapes, etc., so that the first sharing line SHL1, the second sharing line SHL2, and the third sharing line SHL3 have different resistance values, respectively.

Optionally, still referring to FIG. 2A and FIGS. 8 to 9, the display panel further includes a first shielding layer DBS, and the first shielding layer DBS includes a plurality of first shielding wires DBS1 and a plurality of second shielding wires DBS2, each of the first shielding lines DBS1 extends along the second direction y, each of the first shielding lines DBS1 is located between adjacent ones of the sub-pixels 101, and an orthographic projection of the data line DL on the first shielding line DBS1 is located in the first shielding line DBS1; each of the second shielding lines DBS2 is located between the main pixel electrode 1001 and the auxiliary pixel electrode 1002 of each of the sub-pixels 101, and each of the second shielding wires DBS2 is electrically connected to two of the first shielded wires DBS1 adjacent to the second shielding wires DBS2. The first shielding line DBS1 and the second shielding line DBS2 are located in the same layer as the main pixel electrode 1001 and the auxiliary pixel electrode 1002, and the fifth line s15 is located on at least one side of the second shielding line DBS2, so as to prevent a short circuit between the fifth sub-wire s15 and the second shielding wire DBS2.

Optionally, the display panel further includes a second shielding layer SM located on a side of the plurality of sharing lines SHL away from the main pixel electrode 1001 and the auxiliary pixel electrode 1002. The second shielding layer SM includes a third shielding wire SM1 and a fourth shielding wire SM2, and the third shielding wire SM1 corresponds to the first wire s11 and the second wire s12 of the plurality of shared wires SHL, the fourth shielding line SM2 corresponds to a frame electrode of the main pixel electrode 1001 and the auxiliary pixel electrode 1002 extending along the second direction y, and an orthographic projection of the data line DL on the second shielding layer SM is located between two of the fourth shielded wires SM2. The second shielding layer SM is located in the same layer as the scanning line SL. The first shielding layer DBS and the second shielding layer SM are configured to shield the electric field.

Optionally, the resistance of the sharing line SHL can also be increased by increasing the routing distance.

When the color shift problem of multi-color mixing occurs in the display panel, the shared voltage signal transmitted by the first sharing line SHL1, the shared voltage signal transmitted by the second sharing line SHL2, and the shared voltage signal transmitted by the third sharing line SHL3 are different from each other. The shared voltage signals of the brightness ratios of the sub-pixels 1011, the second sub-pixels 1012 and the third sub-pixels 1013 are used to alleviate the color shift problem of multi-color mixing in the display panel.

Optionally, in the driving module, a first control signal is transmitted to the power management chip through a timing control signal, and the power management chip transmits a second control signal to the source driving chip according to the first control signal, and the power management chip transmits a second control signal to the source driving chip. The source driving chip provides the shared voltage signal to the plurality of sharing lines according to the second control signal.

Embodiments of the present application also provide a control method for a display panel, which is used to control any of the above-mentioned display panels, and the control method includes the following steps:

Step S1: according to a color of color shift displayed by the display panel, adjusting a shared voltage signal transmitted by the one of the sharing lines electrically connected to the auxiliary pixel electrodes of the sub-pixels corresponding to the color of color shift, so that the shared voltage signal after the adjusting is different from the shared voltage signal transmitted by the sharing lines electrically connected to the auxiliary pixel electrodes of the sub-pixels with different emission colors, so as to adjust the sub-pixels corresponding to the color of color shift, thereby adjusting the pixel voltage of the auxiliary sub-pixel of the sub-pixel corresponding to the color of color shift is adjusted, and adjusting the brightness of the sub-pixel corresponding to the color of color shift, thus alleviating the problem of color shift of the display panel.

Taking the display panel as a monochromatic color shift as an example, the plurality of sub-pixels include a first sub-pixel and a second sub-pixel with different light emission colors, the plurality of sharing lines include a first sharing line electrically connected to the first sub-pixel and a second sharing line electrically connected to the second sub-pixel, the plurality of data lines include a first data lines electrically connected to the first sub-pixel and a second data line electrically connected to the second sub-pixel, a voltage of the shared voltage signal transmitted by the first sharing line has a first relative voltage with respect to a pixel voltage transmitted by the first data lines, a voltage of the shared voltage signal transmitted by the second sharing line has a second relative voltage with respect to a pixel voltage transmitted by the second data lines; and when the color of the color shift displayed on the display panel is same as an emission color of the first sub-pixel, the step S1 includes:

Step S11: adjusting the first relative voltage so that the adjusted first relative voltage is greater than the first relative voltage. By adjusting the first relative voltage, the pixel voltage of the auxiliary sub-pixel of the first sub-pixel is reduced, so as to adjust the brightness of the first sub-pixel, so as to alleviate the problem of color shift of the display panel.

Optionally, the shared voltage signal transmitted by the first sharing line has a first voltage when the pixel voltage corresponding to the pixel voltage transmitted by the first data lines is positive, the shared voltage signal transmitted by the first sharing line has a second voltage when the pixel voltage corresponding to the pixel voltage transmitted by the first data lines is negative; the shared voltage signal transmitted by the second sharing lines has a third voltage when the pixel voltage corresponding to the pixel voltage transmitted by the second data lines is positive, the shared voltage signal transmitted by the second sharing lines has a fourth voltage when the pixel voltage corresponding to the pixel voltage transmitted by the second data lines is negative; and the step S11 includes: adjusting the first voltage and the second voltage, so that the adjusted first voltage is smaller than the third voltage, and the adjusted second voltage is greater than or equal to the fourth voltage; the adjusted first voltage is smaller than the adjusted second voltage, and the third voltage is smaller than the fourth voltage. By adjusting the first voltage and the second voltage, then adjusting the pixel voltage of the auxiliary sub-pixels of the first sub-pixel, and adjusting the brightness of the first sub-pixel, the problem of color shift of the display panel is alleviated.

Optionally, the shared voltage signal transmitted by the first sharing line has a fifth voltage, and the shared voltage signal transmitted by the second sharing line has a sixth voltage. The step S11 includes: adjusting the fifth voltage, so that the adjusted fifth voltage is smaller than the sixth voltage. By adjusting the fifth voltage, the pixel voltage of the auxiliary sub-pixel of the first sub-pixel is adjusted, so as to adjust the brightness of the first sub-pixel, and alleviate the problem of color shift of the display panel.

Optionally, the shared voltage signal transmitted by the first sharing line can be directly adjusted by the driving module, so as to adjust the brightness of the first sub-pixel; or the resistance value of the first sharing line can be adjusted, so as to adjust the brightness of the first sub-pixel. Optionally, the resistance value of the sharing line can be adjusted by connecting resistors in series, line switching, or the like. Correspondingly, the step S11 includes: adjusting the resistance of the first sharing line, so that the adjusted resistance of the first sharing line is greater than the resistance of the second sharing line.

Optionally, the display panel further includes a driving module and a plurality of resistors, and the plurality of resistors include first resistors connected in series between the driving module and the first sharing line, and second resistors connected in series between the driving module and the second sharing line; and the step S11 includes: adjusting a resistance of the first resistors to be greater than a resistance of the second resistors. By adjusting the resistance value of the first resistor, the pixel voltage of the auxiliary sub-pixel of the first sub-pixel is adjusted, thereby adjusting the brightness of the first sub-pixel and alleviating the problem of color shift of the display panel.

It is appreciated that when the display panel has the color shift problem of color mixing, the control method for the display panel is similar to the control method for the display panel having the problem of monochromatic color shift, and details are not repeated herein for brevity.

The present application also provides a display device, the display device includes any of the above-mentioned display panels and a backlight unit, the display panel is connected to the backlight unit, and the backlight unit provides backlight for the display panel. It is appreciated that the display device includes a movable display device (such as a notebook computer, a mobile phone, etc.), a fixed terminal (such as a desktop computer, a TV, etc.), a measurement device (such as a sports bracelet, a thermometer, etc.), and the like.

The description of the above embodiments is only for helping to understand the method of the present disclosure, and the core concept, and the content of the present specification should not be construed as limiting the disclosure.

What is claimed is:

1. A control method for a display panel, wherein the display panel comprises a plurality of sub-pixels, a plurality of pixel driving circuits, a plurality of data lines, and a plurality of sharing lines; each of the sub-pixels comprises a main pixel electrode and an auxiliary pixel electrode, each of the pixel driving circuits is electrically connected to a corresponding one of the sub-pixels, and each of the pixel driving circuits comprises a first transistor, a second transistor, and a third transistor;

each of the data lines is connected to a corresponding one of main pixel electrodes through the first transistor, each of the data lines is further electrically connected to a corresponding one of auxiliary pixel electrodes through the second transistor, and each of the sharing lines is electrically connected to the corresponding one of the auxiliary pixel electrodes through the third transistor; and the control method comprises the following steps:

Step S1: according to a color of color shift displayed by the display panel, adjusting a shared voltage signal transmitted by one of the sharing lines electrically connected to the auxiliary pixel electrode of one of the sub-pixels corresponding to the color of color shift, so that the shared voltage signal after the adjusting is different from a shared voltage signal transmitted by the sharing lines electrically connected to the auxiliary pixel electrodes of the sub-pixels with different emission colors;

wherein the plurality of sub-pixels comprise a first sub-pixel and a second sub-pixel with different light emission colors, the plurality of sharing lines comprise a first sharing line electrically connected to the first sub-pixel and a second sharing line electrically connected to the second sub-pixel, the plurality of data lines comprise a first data line electrically connected to the first sub-pixel and a second data line electrically connected to the second sub-pixel, a voltage of a shared voltage signal transmitted by the first sharing line has a first relative voltage with respect to a pixel voltage transmitted by the first data line, a voltage of a shared voltage signal transmitted by the second sharing line has a second relative voltage with respect to a pixel voltage transmitted by the second data line; and when the color of the color shift displayed on the display panel is same as an emission color of the first sub-pixel, the step S1 comprises:

Step S11: adjusting the first relative voltage so that the first relative voltage after the adjusting is greater than the second relative voltage.

2. The control method according to claim 1, wherein the sharing voltage signal transmitted by the first sharing line has a first voltage when the pixel voltage corresponding to the pixel voltage transmitted by the first data line is positive, the sharing voltage signal transmitted by the first sharing line has a second voltage when the pixel voltage corresponding to the pixel voltage transmitted by the first data line is negative; the sharing voltage signal transmitted by the second sharing lines has a third voltage when the pixel voltage corresponding to the pixel voltage transmitted by the second data line is positive, the shared voltage signal transmitted by the second sharing line has a fourth voltage when the pixel voltage corresponding to the pixel voltage transmitted by the second data line is negative; and the step S11 comprises:

adjusting the first voltage and the second voltage so that the first voltage after the adjusting is smaller than the third voltage, and the second voltage after the adjusting is greater than or equal to the fourth voltage.

3. The control method according to claim 2, wherein the first voltage after the adjusting is smaller than the second voltage after the adjusting, and the third voltage is smaller than the fourth voltage.

4. The control method according to claim 2, wherein a difference between the third voltage and the first voltage after the adjusting is greater than OV and less than or equal to 5V.

5. The control method according to claim 2, wherein a difference between the second voltage after the adjusting and the fourth voltage is greater than or equal to 0V and less than or equal to 5V.

6. The control method according to claim 1, wherein the shared voltage signal transmitted by the first sharing line has a fifth voltage, the shared voltage signal transmitted by the second sharing lines has a sixth voltage, and the step S11 comprises:

adjusting the fifth voltage so that the fifth voltage after the adjusting is smaller than the sixth voltage.

7. The control method according to claim 1, wherein the step S11 comprises: adjusting a resistance of the first sharing line, so that after the adjusting, the resistance of the first sharing line is greater than a resistance of the second sharing line.

8. The control method according to claim 7, wherein the display panel further comprises a driving module and a plurality of resistors, and the plurality of resistors comprise first resistors connected in series between the driving module and the first sharing line, and second resistors connected in series between the driving module and the second sharing line; and the step S11 comprises:

adjusting a resistance of the first resistors to be greater than a resistance of the second resistors.

9. The control method according to claim 8, wherein the display panel comprises a flexible circuit board electrically connected between a printed circuit board and the display panel; and the plurality of resistors are located on the printed circuit board.

10. A display panel, wherein the display panel comprises:

a plurality of sub-pixels, wherein each of the sub-pixels comprises a main pixel electrode and an auxiliary pixel electrode;

a plurality of pixel driving circuits, wherein each of the pixel driving circuits is electrically connected to a corresponding one of the sub-pixels, and each of the pixel driving circuits comprises a first transistor, a second transistor, and a third transistor;

a plurality of data lines, wherein each of the data lines is connected to a corresponding one of main pixel electrodes through the first transistor, each of the data lines is further electrically connected to a corresponding one of auxiliary pixel electrodes through the second transistor; and a plurality of sharing lines, wherein each of the sharing lines is electrically connected to a corresponding one of the auxiliary pixel electrodes through the third transistor;

wherein shared voltage signals transmitted by the sharing lines electrically connected to the auxiliary pixel electrodes of the sub-pixels with different emission colors are at least partially different;

wherein the plurality of the sub-pixels comprise a first sub-pixel and a second sub-pixel with different light emission colors, the plurality of sharing lines comprise a first sharing line electrically connected to the first sub-pixel and a second sharing line electrically connected to the second sub-pixel, the plurality of data lines comprise a first data line electrically connected to the first sub-pixel and a second data line electrically connected to the second sub-pixel, a voltage of a shared voltage signal transmitted by the first sharing line has a first relative voltage with respect to a pixel voltage transmitted by the first data line, a voltage of a shared voltage signal transmitted by the second sharing line has a second relative voltage with respect to a pixel voltage transmitted by the second data line; and when a color of a color shift displayed on the display panel is same as an emission color of the first sub-pixel, the first relative voltage is greater than the second relative voltage.

11. The display panel according to claim 10, wherein the display panel comprises a display area, each of the sharing lines comprises a first line, a second line, and a third line located in the display area, the first line and the second line extend along a second direction and are arranged in parallel with the data lines, and the third line electrically connects the first line and the second line.

12. The display panel according to claim 11, wherein the first line, the second line, and the third line are disposed in a same layer as the data lines.

13. The display panel according to claim 11, wherein at least one of the sharing lines further comprises a fourth line, the fourth line is electrically connected to at least one of the first line, the second line, or the third line; and wherein a square resistance of the fourth line is greater than a square resistance of the first line.

14. The display panel according to claim 13, wherein a material of the fourth line comprises at least one of indium tin oxide, aluminum-doped zinc oxide, fluorine-doped tin oxide, antimony-doped tin oxide, or conductive oxide thin films.

15. The display panel according to claim 13, wherein the display panel further comprises:

a second insulating layer disposed on the data lines, a color resist layer disposed on the second insulating layer; and, a third insulating layer disposed on the color resist layer, wherein the fourth line is located between the third insulating layer and the color resist layer.

16. The display panel according to claim 11, wherein each of the main pixel electrodes has a first trunk extending along the second direction; and each of the auxiliary pixel electrodes has a second trunk extending along the second direction; and wherein an orthographic projection of the first line on the first trunk is located within the first trunk, an orthographic projection of the second line on the second trunk is located within the second trunk, and the third line is located between the auxiliary pixel electrode and the main pixel electrode of each of the sub-pixels.

17. The display panel according to claim 11, wherein the third line further comprises a first sub-section and a second sub-section spaced apart from each other, and at least one of the sharing lines further comprises a fifth line located between the main pixel electrode and the auxiliary pixel electrode and located in the display area, and two terminals of the fifth line are electrically connected to the first sub-section and the second sub-section; and wherein a square resistance of the fifth line is greater than a square resistance of the third line, and the fifth line is located in a same layer as the main pixel electrode and the auxiliary pixel electrode.

18. The display panel according to claim 17, wherein the display panel further comprises a plurality of first shielding lines and a plurality of second shielding lines, each of the first shielding lines extends along the second direction, each of the first shielding lines is located between adjacent ones of the sub-pixels, and an orthographic projection of the data lines on the first shielding lines is located within a boundary of the first shielding lines; each of the second shielding lines are located between the main pixel electrode and the auxiliary pixel electrode of each of the sub-pixels, and each of the second shielding line is electrically connected to adjacent ones of the first shielding lines; and wherein the first shielding lines and the second shielding lines are disposed in a same layer as the main pixel electrode and the auxiliary pixel electrode, and the fifth line is located on at least one side of the second shielding lines.

19. The display panel according to claim 10, wherein the display panel further comprises an alternating current AC voltage source, and the AC voltage source is electrically connected to the plurality of the sharing lines.

* * * * *